INVENTOR
ROBERT LOUIS PERES

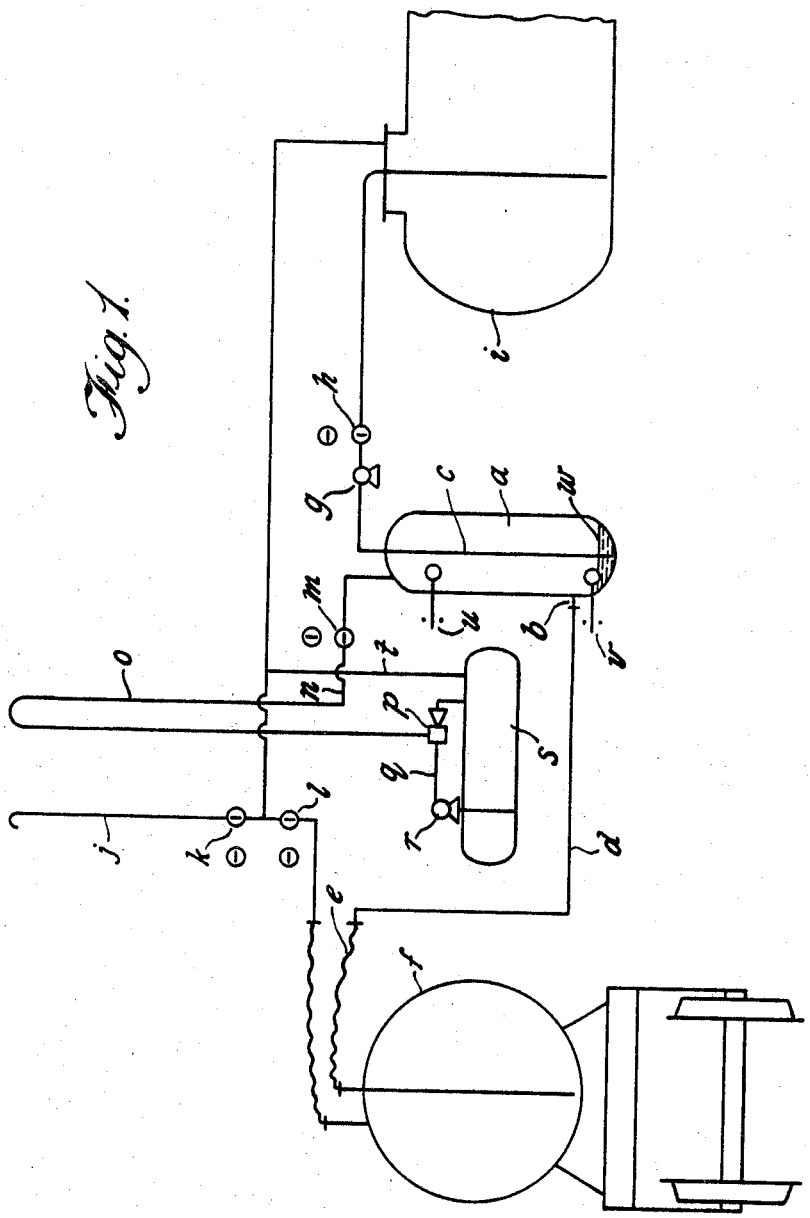

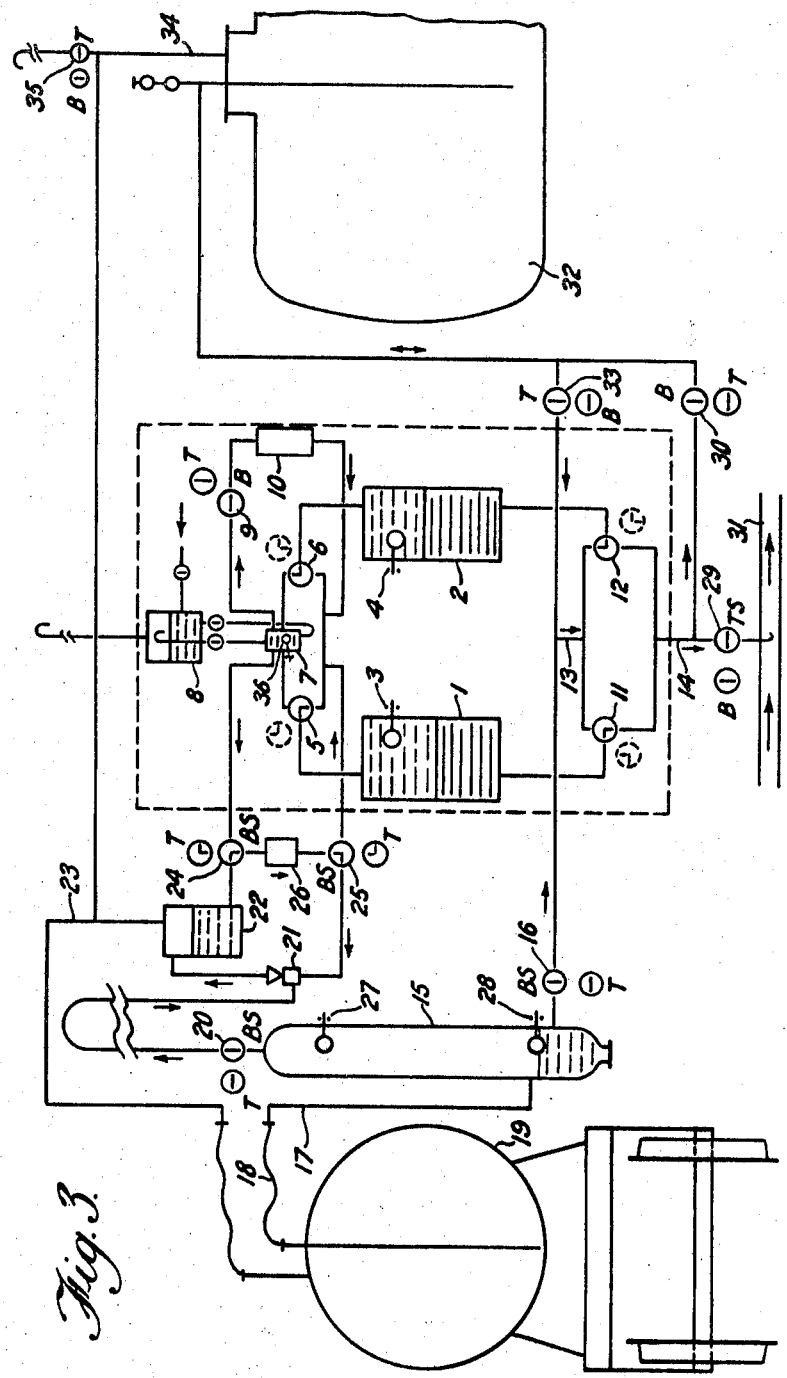

United States Patent Office 3,465,767
Patented Sept. 9, 1969

3,465,767
METHOD AND APPARATUS FOR LIQUID TRANSFER
Robert L. Peres, Neuilly-sur-Seine, France, assignor to The Associated Octel Company Limited, London, England, and Octel S.A., Paris, France, jointly
Filed Apr. 20, 1967, Ser. No. 632,442
Claims priority, application Great Britain, Apr. 27, 1966, 18,466/66
Int. Cl. F04f 1/14
U.S. Cl. 137—2    8 Claims

ABSTRACT OF THE DISCLOSURE

The invention concerns an apparatus and method for the transfer of liquid. The liquid is first withdrawn by suction into priming vessel to create a head of liquid. Once the head of liquid is established, the liquid is discharged from the priming vessel and simultaneously fresh liquid is withdrawn from the source to maintain the head of liquid in the priming vessel. Preferably the whole operation is automatically controlled by float switches operated by the liquid level in the priming vessel.

---

This invention relates to liquid transfer apparatus and to a method for transferring liquids from one vessel to another.

In the transfer of liquid, such as lead alkyls, problems arise from the corrosivity and/or toxicity of the liquid being handled. Thus, where the liquid is corrosive special corrosion-resistant equipment is required, which is expensive, particularly where pumps are concerned. On the other hand, where the liquid is toxic, problems arise in the maintenance and repair where contact with the liquid may present a serious health hazard to the maintenance staff. Such problems are particularly severe with liquids such as lead alkyls.

Accordingly it is an object of the invention to provide a liquid transfer apparatus and method for handling corrosive and/or toxic liquids which requires the minimum of expensive corrosion resistant equipment and at the same time requires the minimum of maintenance and which permits the handling of such liquids with the minimum of danger to the health of the operators.

According to the invention the transfer apparatus comprises an airtight priming vessel, an inlet in the priming vessel in a region of the vessel below the upper end thereof and adapted to be connected to a source of the liquid to be transferred, an outlet in the priming vessel for the discharge of the liquid therefrom, an evacuator adapted to draw the liquid to be transferred into the vessel to a level above said outlet, first valve means adapted to seal the vessel to maintain said level above said outlet while liquid is discharged from the vessel through said outlet and second valve means connected to said outlet to permit discharge of the liquid from said vessel through said outlet. The discharge from the priming vessel may be under gravity, but more usually the apparatus will include a pump connected to said outlet for discharge of the liquid from the vessel. In a preferred arrangement the outlet comprises a conduit extending downwardly into the vessel from an upper region thereof and terminating at a point adjacent to the bottom of the vessel.

The evacuator may simply be a vacuum pump, but in the preferred arrangement the evacuator comprises an eductor connected in an air line from an upper region of said vessel and a pump adapted to circulate a liquid such as water through the eductor valve from a liquid reservoir thereby to draw air through said valve from said vessel thereby creating a vacuum in the priming vessel.

In an alternative arrangement the evacuator may comprise an eductor, a pump adapted to circulate liquid from the priming vessel through the eductor and a suction line connecting the eductor to the source of the liquid to be transferred. In this arrangement the vessel is primed without actual evacuation of the vessel as in the case previously mentioned. Instead the liquid is sucked into the vessel through the eductor, and all that needs evacuation is the suction line between the eductor and the source. When the desired level is reached the supply is switched by an appropriate valve to the main inlet of the vessel and the eductor circuit closed down. This arrangement is particularly convenient as the same pump can be used to perform both the priming and transfer operations.

The apparatus according to the invention may be manually operated, but is preferably automatically operated by means of float operated switches in said priming vessel adapted to operate electrical and/or pneumatic control circuits to the various valves and pumps when the liquid level in the vessel reaches predetermined level or levels.

The transfer apparatus according to this invention is particularly, but not exclusively, designed to operate in conjunction with the liquid metering system disclosed and claimed in copending patent application Ser. No. 525,661.

In this copending application there is disclosed, inter alia, a method and apparatus for metering quantities of liquid, particularly lead alkyls such as lead tetraethyl, by a displacement technique which permits the said liquid to be metered without the liquid itself passing through any meter or pump. In this way the liquid may be metered without fear of damage to sensitive metering equipment and pumps by solid particulate impurities which may be present in the liquid or by the corrosive action of the liquid itself.

In accordance with that application the liquid to be metered, e.g., lead alkyl, is caused to flow alternately into two reservoirs which are coupled by a pipeline and which contain a fluid medium, usually water, which is immiscible with the lead alkyl and which is displaced from one reservoir to the other and back as each in turn is filled with lead alkyl. As each reservoir is filled with lead alkyl the other reservoir, which was filled with lead alkyl on the previous cycle, is discharged into the gasoline stream. The alternating cycle of filling and discharging the reservoirs is preferably controlled automatically by means of float switches in one or other or both reservoirs which are actuated by the lead alkyl when a particular level is reached. The float switches serve to actuate appropriately placed valves to reverse the flow directions. Throughout the operation the flow rate of the immiscible fluid medium between the two reservoirs is measured to indicate the flow rate of the lead alkyl. The flow rate of the displaced fluid medium may be measured either by means of a flow meter or by means of a metering pump.

In accordance with the present invention this metering apparatus is modified and improved by coupling it to a transfer apparatus of the type hereinbefore described. Thus the liquid is delivered from the priming vessel to the two reservoirs of the metering apparatus for metering before its final delivery to a storage tank or other destination.

In a particularly preferred arrangement of this combined apparatus, and one which is most useful for blending one liquid, such as a lead alkyl, in metered quantities into another liquid, such as gasoline, the metering apparatus is connected on the inlet side to the transfer apparatus and on the outlet side to a storage vessel. The transfer apparatus then serves to draw the liquid to be metered from a delivery tank and to transfer the liquid through the metering apparatus to the storage vessel, or alternatively to a discharge line. When the delivery tank is empty the transfer apparatus can be isolated from the metering apparatus by an appropriately placed valve and the delivery tank removed. The liquid is now retained in the storage tank until required. The storage vessel is also connected to the inlet side of the metering apparatus so that at the desired time the liquid can be withdrawn from the storage vessel through the metering apparatus into the discharge line. The combined apparatus thus serves as a transfer apparatus for discharging liquid from a delivery vessel into a storage tank and as a metering apparatus for delivering measured quantities of the liquid from the storage tank into a discharge line. Alternatively the apparatus may be used to deliver liquid straight from the delivery tank through the meter to the discharge line thus bypassing the storage tank.

While the invention has been described so far in terms of an apparatus for liquid transfer, the invention is also concerned with a method of liquid transfer. According to this method liquid is transferred from one vessel to another vessel or other destination by drawing the liquid by suction into an intermediate priming vessel from the first vessel to create a head of liquid in said priming vessel and discharging liquid from the priming vessel whilst maintaining said head of liquid by withdrawal of further liquid from the supply vessel into the priming vessel.

The invention will be further described with reference to the accompanying drawings, in which:

FIG. 1 is a diagrammatic flow sheet of a liquid transfer apparatus according to the invention;

FIG. 3 is a diagrammatic flow sheet of a liquid transfer apparatus similar to that shown in FIG. 1 but coupled to a liquid metering apparatus similar to that illustrated and described in the specification of the said copending application.

Figure 1A:
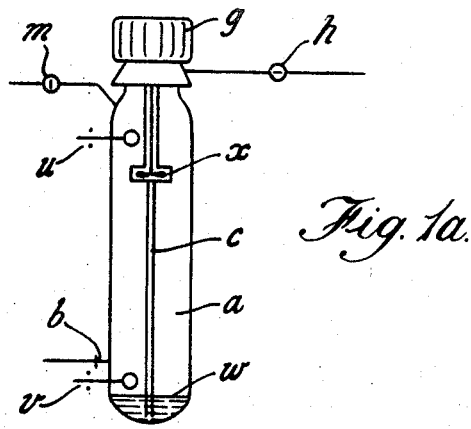
FIG. 1a is an illustration of a modified arrangement of the priming vessel shown in FIG. 1.

Referring to FIG. 1, the transfer apparatus according to the invention comprises an airtight priming vessel $a$ having an inlet connection $b$ and an outlet connection $c$ both located in the lower regions of the vessel. The outlet connection $c$ as shown comprises a conduit extending downwardly into the vessel and terminating adjacent the bottom wall.

The inlet connection $b$ is connected through an inlet line $d$ to a flexible connecting line $e$. The flexible line $e$ is in turn adapted to be detachably connected to a delivery tanker $f$, which is shown as a rail tank, but which, of course, could be any other sort of delivery vessel.

The outlet connection $c$ of the priming vessel is connected through a pump $g$ and a valve $h$ to a storage tank $i$. The air vent connections of the delivery tanker $f$ and the storage tank $i$ are connected to a common air vent $j$ which is open to the atmosphere through valve $k$. A valve $l$ is provided in the air vent line to the tanker.

Connected to the upper end of the priming vessel $a$ through a valve $m$ is an air line $n$ communicating through a loop $o$ to an eductor $p$. The eductor is mounted in a line $q$ through which water may be circulated by a circulating pump $r$ from a water reservoir $s$. An air line $t$ connects the reservoir $s$ to the air vent $j$.

Provided in the priming vessel in the upper and lower regions thereof are two float operated switches $u$ and $v$.

The operation of the apparatus shown in FIG. 1 is as follows. On arrival, the delivery tanker $f$ is connected up to the flexible line $e$ and to the air vent $j$. At this stage of the operation the priming tank is empty except for a residual amount of liquid left at the end of the previous operating sequence. Valve $h$ is closed and the pump $g$ inactive. Valves $k$, $l$ and $m$ are all open. With the apparatus in this condition the transfer operation begins with the starting up of the pump $r$. Water is circulated through the eductor $p$ and air is drawn out of the priming vessel $a$ through the air line $n$. As the priming vessel is evacuated liquid is drawn in from the delivery tank through inlet line $d$ and the liquid level $w$ in the priming vessel rises until it reaches the upper float switch $u$.

The operation of the float switch $u$ by the liquid actuates control circuits, not shown, but which are quite conventional pneumatic and/or electrical circuits, to switch circulating pump $r$ and pump $g$ off and on respectively and to close valves $m$ and $k$ while opening valves $h$ and $l$. The control circuits are arranged to operate the valves and pumps virtually simultaneously so that the closing of valve $m$ maintains the vacuum in the priming vessel $a$ thereby maintaining the head of liquid in the vessel. Priming of the transfer apparatus is now complete. Pumping now begins with pump $g$ pumping liquid from the priming vessel through valve $h$ into the storage tank $i$. All the while the head of liquid in the priming vessel is maintained by further liquid drawn from the delivery tank. Air and vapour displaced from the storage tank are fed back to the delivery tank through valve $l$.

When finally the delivery tank is empty, air and vapour now enter the priming vessel from the delivery tanker so that the liquid level in the priming vessel will begin to fall until it reaches the lower float switch $v$. The pumping operation is now over and the shutdown operation begins.

When the liquid level in the priming vessel reaches the lower float switch $v$, this switch operates the control circuits to close valve $h$ and switch off pump $g$. Virtually simultaneously circulating pump $r$ is switched on, valves $k$ and $m$ are opened and valve $l$ is closed. A vacuum is thus recreated in the priming vessel and in the lines $d$ and $e$. The latter can then safely be disconnected from the tanker as well as the air vent line. The empty tanker can then be taken away. The maintenance of a vacuum in the inlet line while it is being disconnected is particularly advantageous when handling a toxic liquid.

The circulating pump is now switched off and the shutdown operation is complete. The apparatus is also ready for the operating cycle to begin all over again with the arrival of the next delivery tanker.

A modified arrangement of the priming vessel is shown in FIG. 1a. In this modification the pump $g$ drives an impeller $x$ mounted inside the outlet conduit $c$ in the priming vessel $a$. During the pumping operation this impeller draws the liquid up the outlet conduit and feeds the liquid through the valve $m$ to the storage tank.

A further modification which may be made in the apparatus shown, particularly where the liquid being handled is tetraethyl lead as opposed to tetramethyl lead, is the removal of valves $l$ and $k$ and the air vent connection between the delivery tanker $f$ and the storage tank $i$. Instead these are vented directly to the atmosphere so that vapour and air displaced from the storage tank during filling is vented to the atmosphere rather than fed back to the delivery tanker. With such an arrangement air is allowed to enter the tanker during the pumping stage and during the shutdown stage when air is drawn through the inlet line to flush it clear.

As will be appreciated, the whole transfer operation is substantially automatic, although it could be manually controlled if desired. With automatic operation arrangements are made in the control circuit to valve $h$ to give a slight delay in the opening and closing of this valve. This maintains a back pressure on the pump $g$ and prevents hammering of the valve when shutting down. A further precautionary measure which may be noted is the provision of the vertical loop $o$. This loop serves to prevent the liquid from being drawn through into the eductor in the event of the failure of the upper float switch $u$.

Figure 2:
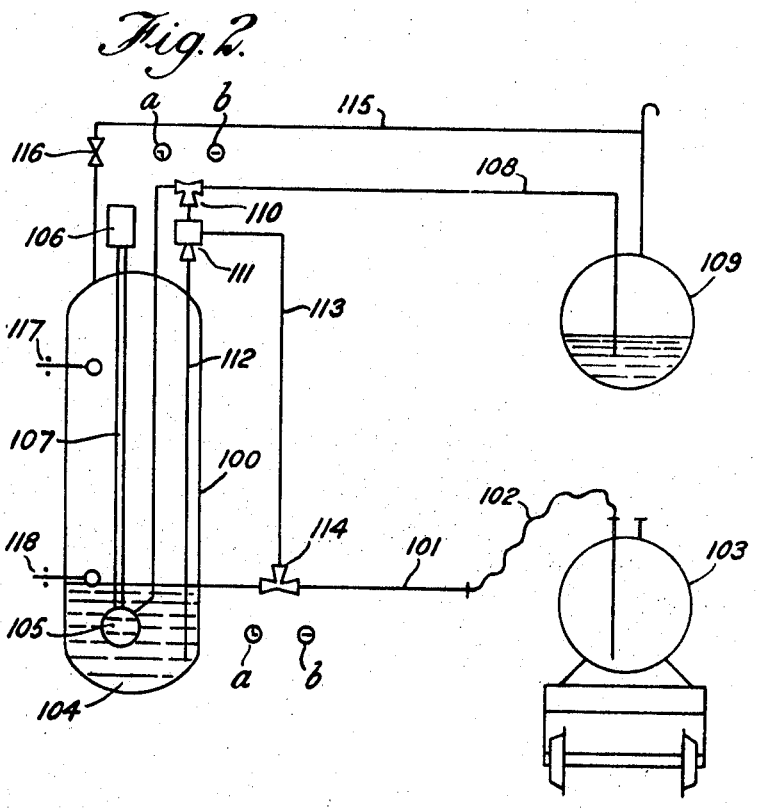
FIG. 2 is a diagrammatic flow sheet of an alternative embodiment of apparatus according to the invention.

Referring to the apparatus illustrated in FIG. 2 of the accompanying drawings, this represents an alternative arrangement to FIG. 1. In this arrangement the apparatus comprises a priming vessel 100 having an inlet line 101 connectable through a flexible line 102 to the delivery tanker 103. The vessel 100 contains a residual amount of liquid 104 left in the vessel from the previous operating cycle. Immersed in this liquid is a pump 105 driven by an external motor 106 through a long shaft 107. The pump 105 is connected through the outlet line 108 to a storage tank 109.

Connected to the outlet line 108 through a 3-way valve 110 is an eductor 111 having a return line 112 extending into the priming vessel 100. Also connected to the eductor 111 is a suction line 113 leading to a three way valve 114 in the inlet line 101.

The upper end of the priming vessel 100 has an air vent line 115 provided with a shut off valve 116.

Mounted in the vessel 100 are two float operated switches 117 and 118 which operate control circuits (not shown) to the valves 110, 114 and 116.

The operation of the transfer apparatus shown in FIG. 2 is as follows. On arrival at the unloading point the delivery tanker 103 is connected up to the flexible line 102. With the valves 110 and 114 in position $a$ and the air vent valve 116 open the pump 105 is operated to prime the vessel 100 with liquid from the tanker 103. Operation of the pump 105 circulates the residual liquid 104 through the eductor 111 via valve 110 and back into the vessel through return line 112. This creates a suction in line 113 which sucks liquid out of the tanker into the inlet line 101 and from there through valve 114 and the eductor 111 into the vessel 100 via the return line 112.

The liquid level in the priming vessel now rises with air and vapour being expelled through the air vent line 115. When the level reaches the upper float switch 117, the vessel then being fully primed, the switch 117 actuates the control circuit, to the valves 110, 114 and 116 so as to reverse valves 110 and 114 into position $b$ and to close valve 116.

The transfer operation now begins with the pump 105 now discharging the liquid through the outlet line 108 into the storage tank 109. Simultaneously, fresh liquid is drawn from the tanker 103 through the main inlet to maintain the level of the liquid in the priming vessel.

At the end of the transfer operation, when tanker 103 is empty, the liquid level in the priming vessel falls until it reaches the lower float switch 118. This switch is now operated by the falling liquid level to actuate the control circuits to the valves so that valves 110 and 114 are restored to position $a$ and valve 116 reopened. The liquid is now recirculated through the eductor thereby applying suction to the inlet line while the tanker is being disconnected. Finally the pump is switched off to complete the shut down of the apparatus which is now ready for the arrival of the next tanker.

The apparatus illustrated by FIG. 2 has several advantages over that illustrated in FIG. 1. In the first place, the eductor valve only has to evacuate the inlet line and does not have to evacuate the whole priming vessel before priming starts. The priming operation is therefore very much quicker since the volume to be evacuated is very much less. Secondly, the eductor is operated using the residual liquid left in the priming vessel after the transfer operation. This avoids the need for a separate eductor circuit and separate reservoir as in FIG. 1. Finally, the whole of the priming and transfer operation is conducted using only one pump.

Reference is now made to the combined apparatus shown in FIG. 3. This shows an apparatus capable of substantially automatic transfer of liquid from a delivery vessel to a storage tank and automatic blending of the liquid from the storage tank into another liquid stream. Alternatively, the liquid may be blended directly into the liquid stream from the delivery tanker thus bypassing the storage tank.

Referring to FIG. 3, the combined apparatus comprises a transfer apparatus similar to that of FIG. 1, a storage vessel, and in between, enclosed within the broken line, a metering apparatus similar to that described and illustrated in said copending application. This metering apparatus comprises a pair of reservoirs 1, 2 each provided with a float operated switch 3, 4 and each filled approximately half full of compound, with water in the top half.

The two reservoirs are connected through two 2-way 3-port valves 5 and 6 to a water chamber 7 which in turn is connected to a water cistern 8. Also connected to a water chamber through a valve 9 is a metering pump or meter 10. At the lower end, the two reservoirs 1, 2 are connected through two further 2-way 3-port valves 11, 12 to a lead alkyl feed line 13 and alternatively to a lead alkyl discharge line 14. A fuller description of this metering apparatus and its operation and various alternative forms also suitable in the practice of this present invention is to be found in the specification of said copending application. One modification which may be mentioned is the provision of a float operated switch 36 in the water chamber 7. This serves as a safety switch so that, if either of switches 3 or 4 fails, the lead alkyl which collects in chamber 7 will eventually actuate the switch 36 to shut down the whole apparatus.

Turning now to the present invention and considering first of all the feed side of the apparatus, there is connected to the metering apparatus above described a feed system. This comprises a priming vessel 15 connected at its lower end through a valve 16 to the lead alkyl feed line 13. At its lower end, the priming vessel 15 is also provided with an inlet line 17 which, in turn, is connected to a flexible line 18 for connecting to a delivery tanker 19. At its upper end the priming vessel is connected through a valve 20 to an eductor 21 and a water vessel 22. The water vessel 22 has a vent line 23 which can be returned to the delivery tanker 19 and is also connected through two 2-way 3-port valves 24, 25 to a pump 26 and also to the water chamber 7 in the water circuit between the two reservoirs 1 and 2.

Associated with the priming vessel are two float operated switches 27, 28 the function of which will be explained as the description proceeds.

Considering now the discharge side of the apparatus, the lead alkyl discharge line 14 is alternatively connectable through valves 29 and 30 to a gasoline stream 31 or to a storage vessel 32, respectively. The storage vessel is also connected through valve 33 to the lead alkyl feed line 13 and is provided with an air vent line 34 which is connected to air line 23 in the feed system and which may be opened to the atmosphere through valve 35.

The operation of the apparatus illustrated in FIG. 3 can conveniently be divided into three phases: Priming, Transfer and Blending. Each of these is now considered in turn.

*Priming.*—At the start of the priming operation the delivery tanker 19 is connected up to the flexible line 18 and to the air vent line 23. At this stage the priming vessel 15 is almost empty of liquid and the water vessel 22 is full of water. The valve 16 is now closed (position S) and the valves 24 and 25 are in the position shown (position BS) so that the system is isolated from the metering system. Valve 20 is open (position S) and the pump 26 is operated to circulate water through the eductor circuit (21, 22, 24, 25). The passage of water through the eductor 21 draws air out of the priming vessel 15 creating a vacuum therein by means of which lead alkyl is sucked out of the delivery tanker 19 into the bottom of the priming vessel. The level of the lead alkyl in the priming vessel continues to rise until it reaches and operates the upper float switch 27. The feed system is now primed and the transfer operation commences.

*Transfer.*—When the lead alkyl level in the priming vessel reaches the upper float switch 27, this switch is activated and operates a control circuit (not shown, but which may be pneumatic or electric) to close valves 9, 20 (position T), to open valves 16 and 30 (position T) and to reverse valves 24 and 25 (position T), to complete water circuit between vessels 2 and 1 via pump 26.

Lead alkyl now flows from the priming vessel 15 to the reservoir 2 and is replaced by further lead alkyl drawn from the delivery tanker 19. As the lead alkyl level in reservoir 2 rises water is displaced therefrom through the circuit (6, 7, 24, 26, 5) into reservoir 1.

From reservoir 1 lead alkyl charged thereto in a previous cycle is displaced downwardly through valves 11 and 30 into the storage vessel 32. When the lead alkyl level in reservoir 2 reaches the float switch 4 this is actuated to operate the control circuit (not shown) to reverse the valves 5, 6, 11 and 12 into the dotted line position. The direction of flow through the reservoirs is now changed whilst the direction of flow of water through pump 26 remains the same. This cycle of operation continues until the delivery tanker is empty.

As soon as the tanker is empty the lead alkyl level in the priming vessel falls until it reaches float switch 28. The operation of this switch closes valve 16 (position B), opens valve 20 (position B) and reverses valves (24, 25) once more into position BS. Water is now circulated once again through the eductor circuit, the eductor thereby drawing air through line 18 while it and line 23 are being disconnected from the tanker. Following disconnection of the tanker, the pump 26 is stopped and the transfer of the lead alkyl to the storage tank from the delivery tanker is complete, the flow of lead alkyl through the apparatus having been terminated by the closing of valve 16.

The apparatus is now at rest and is ready for the commencement of the blending operation.

*Blending.*—Throughout the blending operation the valve 16 remains closed (position B) and valves 24 and 25 remain in the position shown (position B). The blending commences with the opening of valves 9, 29, 33 and 35 (position B), the closing of valve 30 (position B) and the operation of the metering pump. During blending the lead alkyl is drawn from the storage tank 32 into each reservoir (1 and 2) in turn, the one being charged with lead alkyl whilst the other is discharging lead alkyl through valve 29 into the gasoline stream flowing in line 31. As previously the cycle is automatically controlled by the float switches 3 and 4 which operate in turn to reverse the position of the valves 5, 6, 11 and 12 thereby reversing the direction of flow through the reservoirs whilst maintaining the same direction of flow through the meter or metering pump which records, albeit indirectly, the amount of lead alkyl discharged into the gasoline stream. At the end of the blending operation the pump 10 is switched off and the valves 29 and 33 returned to the closed position (position T).

It will be appreciated from the above description that the whole operation of priming, transfer and blending is performed without the lead alkyl passing through any pump or meter. There is therefore no need for any filters to protect such parts from any solid impurities which may be present in the lead alkyl. Also such parts are not subject to the corrosive action of the lead alkyl compound. Not only this, but it will be noted that the whole operation is automatically controlled, although of course, the process can be manually operated if this was desired. A further advantage of the apparatus illustrated is that the priming of the priming vessel is readily and quickly achieved since the volume of the priming vessel 15 can be kept quite small so that only a small volume of air requires evacuation by the eductor circuit.

It will also be appreciated that many modifications will be possible to the apparatus described above with reference to the drawings and also that even the apparatus illustrated can be operated in a different manner. For example referring to FIG. 3, during the transfer operation the water displaced between the two reservoirs could easily be circulated through a meter in series with pump 26 so that the transfer of lead alkyl from the tanker to the storage tank is metered. Also, of course, the lead alkyl could be metered straight into the gasoline stream from the delivery tanker without intermediate transfer into the storage tank. These and other variations will be readily apparent to those skilled in the art, as also will be the control circuits necessary to operate the various valves in response to the actuation of the various float switches.

It will be appreciated too, that while the invention has been described particularly with reference to the transfer of lead alkyls and the blending of lead alkyls into gasoline, the apparatus may be used for a wide variety of other purposes requiring the transfer of liquid from one vessel to another and to metering out liquid at a measured rate.

I claim:
1. Liquid transfer apparatus comprising
  (a) an airtight priming vessel;
  (b) an inlet in the bottom region of the vessel for feeding liquid thereinto;
  (c) an outlet from the priming vessel for the discharge of liquid therefrom;
  (d) inlet and outlet lines connected to said inlet and outlet, respectively;
  (e) an air vent line extending from the upper end of said priming vessel;
  (f) a first shutoff valve in said air vent line for sealing the priming vessel;
  (g) a second shutoff valve in said outlet line for controlling the discharge of liquid from the priming vessel;
  (h) suction means for drawing the liquid to be transferred through said inlet line under suction and discharging the liquid into the priming vessel;
  (i) first and second float-operated switches mounted respectively in upper and lower regions of the priming vessel; and
  (j) control means operable for closing said first shutoff valve, opening said second shutoff valve and deactivating the suction means when the liquid level in the priming vessel reaches the first float-operated switch and reopening said first shutoff valve, closing the second shutoff valve and reactivating the suction means when the liquid level in the priming vessel falls to said second float operated switch.

2. Apparatus according to claim 1, wherein the suction means comprise:
  (i) an eductor connected to the priming vessel; and
  (ii) a circulating pump adapted to feed a liquid through the eductor thereby to evacuate said vessel and to draw the liquid to be transferred into the priming vessel through said inlet line.

3. Apparatus according to claim 2, wherein the eductor is connected in the air vent line from the priming vessel and there is provided
  (iii) a reservoir for an auxiliary liquid; and
  (iv) a pipe circuit connecting the reservoir to the eductor and the circulating pump whereby the auxiliary liquid may be circulated through said circuit to operate the eductor and evacuate the vessel thereby drawing the liquid to be transferred in through said inlet line.

4. Apparatus according to claim 1, wherein the suction means comprise:
  (i) an eductor,
  (ii) a pipe circuit connecting the priming vessel to the eductor,
  (iii) a suction pipe connected to the eductor,
  (iv) valve means adapted to connect the source of the liquid to be transferred alternatively to the suction pipe and to the inlet to the priming vessel, and
  (v) a pump in said pipe circuit adapted to circulate liquid from the priming vessel through the eductor, thereby to evacuate the suction line and draw liquid from the source into the priming vessel through the eductor.

5. Apparatus according to claim 1, wherein the suction means comprise:
  (i) a valve means in said outlet adapted to connect said outlet alternatively to the outlet line and to an eductor, (ii) an eductor connected to said valve means in said outlet, (iii) a return pipe connecting the eductor to the priming vessel, (iv) a suction pipe connected to the eductor, (v) valve means adapted to connect the source of liquid alternatively to said suction pipe and to the inlet to said vessel, and (vi) a pump connected to said outlet adapted, with the valve means in one position, to circulate liquid from the priming vessel through the eductor thereby to evacuate the suction line and draw liquid from the source through the eductor and into the priming vessel, and, with the valve means in a second position to discharge liquid from the priming vessel to the discharge line while drawing fresh liquid through the inlet line into the vessel from said source.

6. Apparatus according to claim 1, including a liquid metering device connected to the outlet of the priming vessel, said device comprising:

(i) an inlet line connected to the outlet line of the priming vessel, (ii) an outlet line, (iii) a pair of reservoirs connected between said inlet line and said outlet line and adapted to contain a liquid immiscible with the liquid to be transferred, (iv) a pipe connection between the two reservoirs for the flow of said immiscible liquid to and fro between the reservoirs, (v) a meter in said pipe connection for metering the flow of said immiscible liquid, (vi) a first valve means in said inlet and outlet lines, and (vii) a second valve means in said pipe connection, said valve mechanisms being operable periodically to reverse the direction of flow through said reservoirs whilst maintaining the same direction of flow through the meter.

7. Apparatus according to claim 6, including float operated switches in said reservoirs adapted to operate said valve mechanisms to reverse the flow direction when the liquid in the reservoir reaches a predetermined level.

8. A method of transferring liquid from a source to a destination which comprises drawing the liquid by suction from the source into an intermediate airtight priming vessel thereby to establish a head of liquid therein, sensing the establishment of said head of liquid, automatically terminating the suction upon establishment of said head of liquid and sealing the vessel to maintain said head, automatically commencing discharge of the liquid from the priming vessel upon establishment of the head of liquid therein and the sealing thereof and thereby drawing fresh liquid into the vessel from said source to maintain said head, sensing the fall of said head of liquid when the source of liquid is exhausted and automatically terminating the discharge and reestablishing said suction to draw air into the priming vessel when said head falls to a predetermined level.

References Cited

UNITED STATES PATENTS

| | | | |
|---|---|---|---|
| 2,487,863 | 11/1949 | Garretson | 62—55 |
| 2,791,964 | 5/1957 | Reeve | 103—236 X |
| 2,856,950 | 10/1958 | Zars | 137—205 |
| 3,106,071 | 10/1963 | Green | 62—55 |
| 3,211,171 | 10/1965 | Kinsey | 137—205 X |
| 3,307,331 | 3/1967 | Lambert | 137—205 |

ALAN COHAN, Primary Examiner

U.S. Cl. X.R.

137—205; 141—59